5/6/80 XR 4,201,984

United States Patent [19]

Inami et al.

[11] 4,201,984

[45] May 6, 1980

[54] CURRENT CONTROLLED DRIVE SYSTEM FOR ELECTROCHROMIC DISPLAYS OF THE SEGMENTED TYPE

[75] Inventors: Yasuhiko Inami, Tenri; Sadatoshi Takechi, Nara; Tadanori Hishida, Kashihara; Hisashi Uede, Wakayama; Hiroshi Take, Tenri, all of Japan

[73] Assignee: Sharp Kabushiki Kaisha, Osaka, Japan

[21] Appl. No.: 800,009

[22] Filed: May 24, 1977

[30] Foreign Application Priority Data

May 24, 1976 [JP] Japan ..................................... 51-60958

[51] Int. Cl.[2] ................................................ G06F 3/14

[52] U.S. Cl. .................................... 340/763; 340/785; 340/812; 350/357

[58] Field of Search .............. 340/324 R, 324 M, 336, 340/763, 785, 812; 350/160 R, 160 P, 357; 58/50 R

[56] References Cited

U.S. PATENT DOCUMENTS

| | | | |
|---|---|---|---|
| 3,096,271 | 7/1963 | Hespenheide | 340/378 R |
| 3,950,077 | 4/1976 | Jasinski | 340/324 R |
| 4,034,550 | 7/1977 | Kouchi | 58/50 R |
| 4,068,148 | 1/1978 | Nomiya et al. | 340/336 |

OTHER PUBLICATIONS

Features of an Electrochromic Display Device, R. D. Giglia, American Cyanamid Co.

*Primary Examiner*—Marshall M. Curtis
*Attorney, Agent, or Firm*—Birch, Stewart, Kolasch and Birch

[57] ABSTRACT

A driving circuit is provided for an electro-optical display which includes an electrochromic material and a predetermined number of display segments, various combinations of the display segments defining different desired display patterns. The electrochromic phenomenon is developed within the electro-optical display upon a flow of current supplied through the display segments. The driving circuit is so constructed as to supply a predetermined amount of the flow of current to the display segments, of which the current value is changed in accordance with the number of the display segments which change their display states.

14 Claims, 9 Drawing Figures

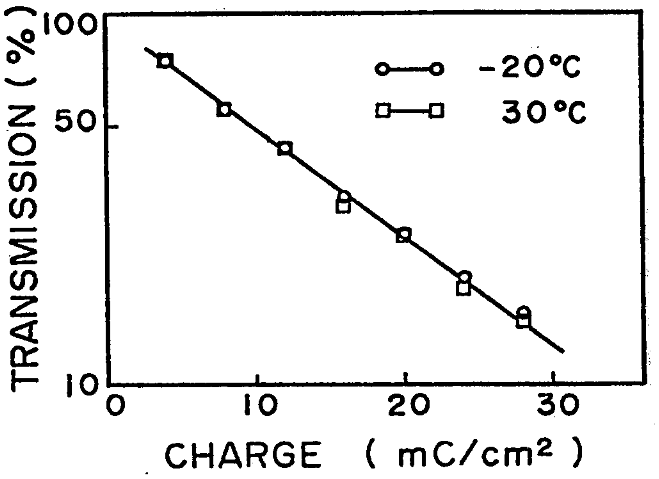
Fig. 9 TRANSMISSION vs CHARGE AT -20°C, 30°C

CURRENT CONTROLLED DRIVE SYSTEM FOR ELECTROCHROMIC DISPLAYS OF THE SEGMENTED TYPE

The present invention relates to the driving method of ECD. ECD stands for 'electrochromic display'. In ECD, a color is induced by the applied current. The induced color is bleached by the current of the opposite polarity of that applied for coloration.

An object of the present invention is to provide a practical constant current driving method for a multi-segment ECD with one constant current source placed in series with the counter electrode, and its current value is changed in accordance with the number of segments which change their display states.

Other objects and novel features of the present invention are set forth in the appended claims and the present invention as to its organization and its mode of operation will best be understood from a consideration of the following detailed description of the preferred embodiments taken in connection with the accompanying drawings, wherein:

FIG. 9 is a graph showing a transmission versus charge characteristic of ECD employed within the present invention.

At first, the general picture of ECD is given. It has been known there are two types of ECD: one is the type to employ the inorganic electrochromic solid thin film; the other is the type to employ the colorless liquid. (Refer to, for example, L. A. Goodman, "Passive Liquid Displays", RCA Report 613258)

Figure 1:
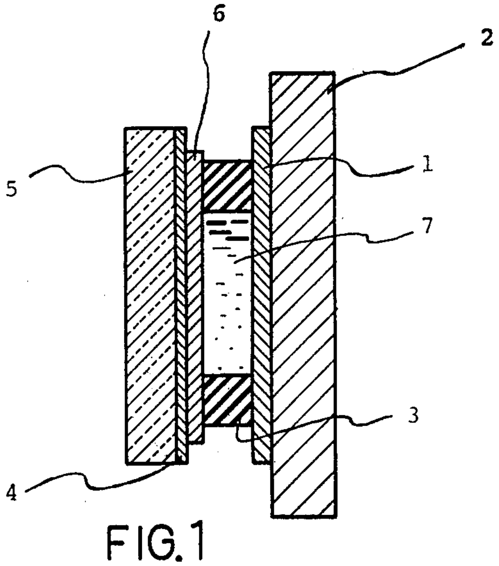
FIG. 1 is a cross sectional view of a basic structure of a solid state ECD.

FIG. 1 shows the typical cell structure of the inorganic solid thin film ECD. In FIG. 1, 1 is a layer of carbon powder mixed with a binder; 2 a stainless steel plate. The layer 1 and the plate 2 make, in combination, the counter electrode. 3 is a spacer; 4 the transparent electrode; 5 the glass substrate; 6 the inorganic solid thin film which shows electrochromism; 7 an electrolyte.

Tungsten trioxide is the most commonly used material for the inorganic film 6. The film thickness is about 1 μm. The electrolyte 7 comprises sulfuric acid, an alcohol such as glycerol and a white pigment such as $BaSO_4$. The spacing between the two electrodes is usually about 1 μm.

Figure 2:
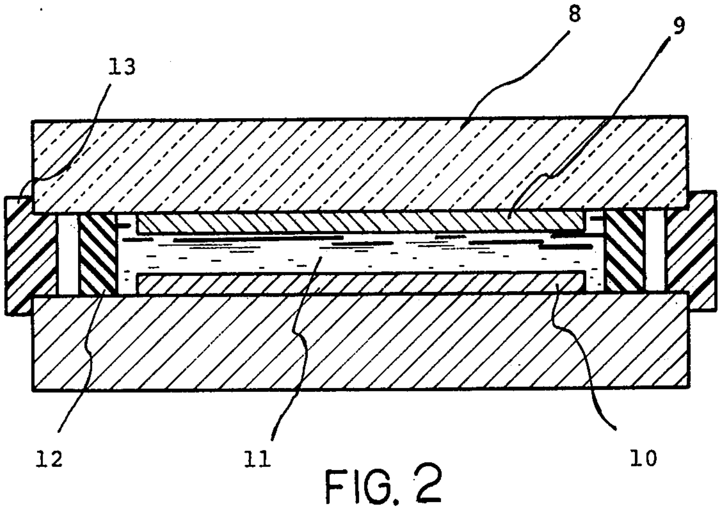
FIG. 2 is a cross sectional view of a basic structure of a liquid state ECD.

FIG. 2 shows the typical cell structure of the second type ECD. In FIG. 2, 8 is a glass substrate; 9 and 10 transparent electrodes; 12 a spacer; 13 a sealing material. 11 is a mixture of water, potassium bromide and heptylviologen bromide.

The HVB system can be used either in a transmissive mode or in a reflective mode. To get the latter mode, the white pigment should be added to the mixture 11.

Merits of ECD are as follows:

1 ECD has a wide viewing angle.

2 ECD consumes rather low power of the order of from a few to a few tens $mJ/cm^2$ per on-off cycle.

3 Life time is measured in terms of on-off cycles.

4 ECD has the inherent memory effect when kept open-circuited, which means memory requires no external power.

5 The color density depends upon the area density of charge which passes through the display area, which means ECD has the gray-scale capability.

In 2 and 3 above, 'on-off cycle' means a cycle when ECD is colored and then bleached.

Figure 3:
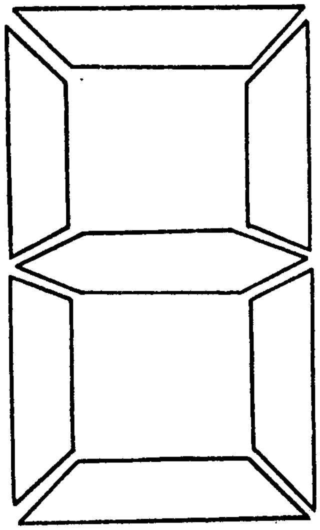
FIG. 3 is a layout of a typical seven-segment numeral display pattern.
Figure 4:
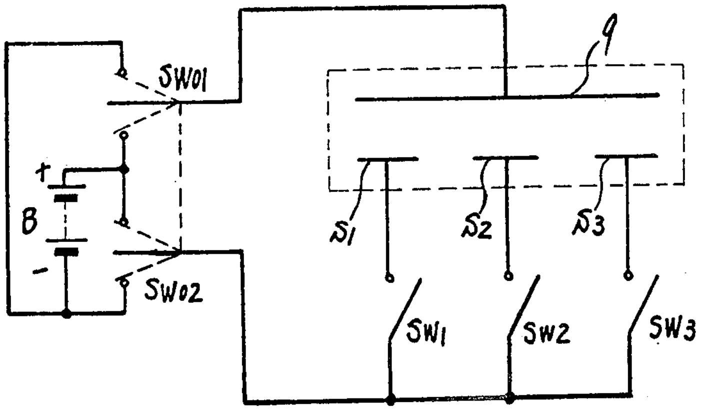
FIG. 4 is a circuit diagram of a typical driver circuit of the constant voltage type for ECD.

FIG. 4 shows the basic driving circuit of the multisegment ECD like the one illustrated in FIG. 3, although for simplicity the segments are only three in number. In FIG. 4, $S_1$, $S_2$ and $S_3$ are display segments; B the power supply; $SW_{01}$ and $SW_{02}$ ganged switches which change the polarity of the applied voltage; and $SW_1$, $SW_2$ and $SW_3$ are segment-switches.

Firstly, the process of coloration or writing will be described. The switches $SW_{01}$ and $SW_{02}$ are turned downward to connect the positive end of the power supply B to the counter electrode; and further, turned on are the segment-switches $SW_1$, $SW_2$, $SW_3$ of those segments S1, S2, S3 which should be colored. Then, the current flows from the counter electrode to the said segments, which means the segments are colored. Segments whose segment-switches are kept open remain in the same display state, namely, colored or bleached states as the case may be.

When a desired degree of coloration is achieved, at least one of the switches $SW_{01}$ and $SW_{02}$ is to be turned off to stop the coloration and put the colored segments in the memory state. To turn off segment-switches of the colored segments, with the switches $SW_{01}$ and $SW_{02}$ on, is another way to put the colored segments in the memory state. If segment-switches are turned off in a staggered manner, coloration degrees vary from segment to segment. Of cource, the longer the on-duration of the segment-switches $SW_1$, $SW_2$, $SW_3$, the deeper the coloration of the respectively associated segments S1, S2, S3.

Secondly, the erasing or bleaching process will now be described. The switches $SW_{01}$ and $SW_{02}$ are turned upward to reverse the polarity of the applied voltage; and the negative end of the power supply B is connected to the counter electrode. At the same time, turned on are the segment-switches $SW_1$, $SW_2$, $SW_3$ of those segments S1, S2, S3 which should be bleached. The current flows in the opposite direction of that of the coloration process. Staggered turning-off of segment-switches results in graded bleaching.

All the switches in FIG. 4 can be transistorized by using transistor switches such as C-MOS bilateral switches.

The aforementioned driving method is called the constant voltage driving method as the constant voltage is applied between the counter and segment electrodes, and this is the most common driving method. But this invention relates more specifically to constant current driving. Hereafter, this method will be described.

Generally speaking, the current in electrochemical reaction increases with temperature going up while the applied voltage remains constant. ECD has the same temperature dependance, and response time increases as the temperature goes down, that is to say, the amount of charge decreases in the lower temperature. But ECD has the characteristic that the coloration degree is the same, when the definite amount of charge is given, in disregard to the temperature change. FIG. 9 shows this fact about $WO_3$ film.

Now it is clear that the constant current driving method makes the response time independent of the temperature change.

Figure 5:
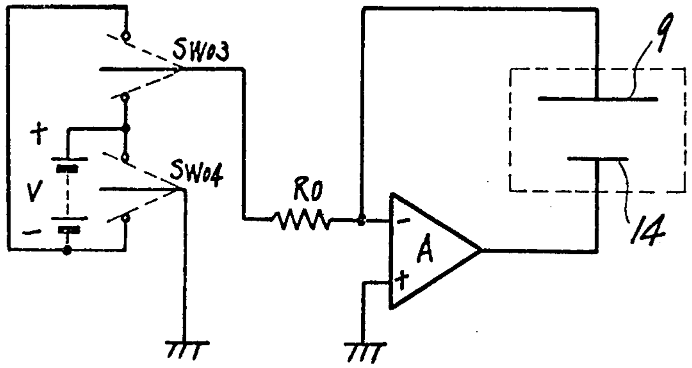
FIG. 5 is a circuit diagram of a basic construction of a driver circuit of the constant current type of the present invention.

FIG. 5 shows one example constant current driving, wherein 9 is a counter electrode; 14 a display electrode; A a differential amplifier; V the power supply voltage; and $R_0$ a resistor. $SW_{03}$ and $SW_{04}$ are the controlling switches for coloration and bleaching.

To color the display electrode 14, said two switches $SW_{03}$ and $SW_{04}$ are turned downward simultaneously so as to make the current flow from the counter electrode 9 to the display electrode 14, and this current has constant value $V/R_0$. When coloration is done enough at least one of the switches $SW_{03}$ and $SW_{04}$ is to be placed in a neutral position to stop the current and put the ECD in the memory state.

To bleach the display electrode 14, the switches $SW_{03}$ and $SW_{04}$ are turned upward simultaneously so as to make the constant current flow in the opposite direction of that of coloration. When bleaching is completed at least one of the said switches $SW_{03}$ and $SW_{04}$ is to be turned to a neutral position to stop the current flow.

The object of the present invention is to provide a practical constant current driving method for a multi-segment ECD with one constant current source placed in series with the counter electrode, and its current value is changed in accordance with the number of segments which change their display states.

There is another type of a constant current driving which employs a constant current source for each segment, but it is not practical when the number of segments get large because it needs as many current sources as driven segments.

The present invention makes it possible to use only one constant current source. Hereafter the invention is described in detail.

Figure 6:
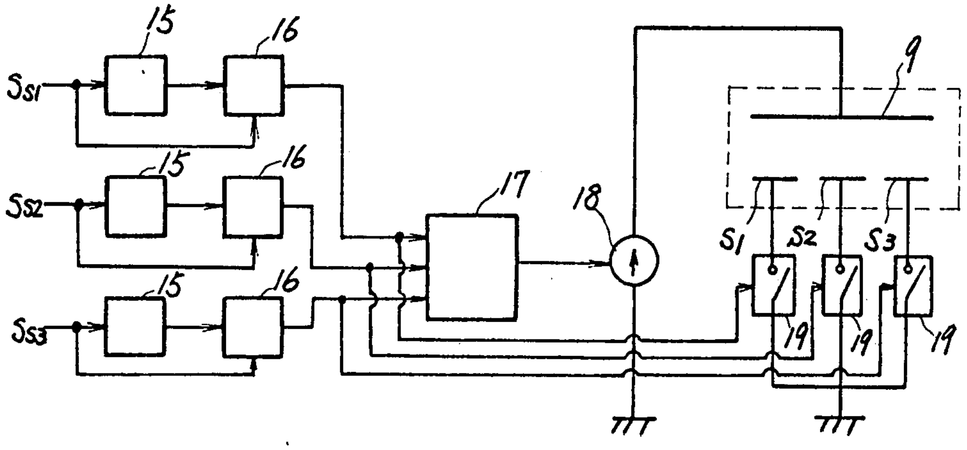
FIG. 6 is a block diagram of an embodiment of a driver circuit of the present invention.

FIG. 6 shows the block diagram of the driving circuit provided by the present invention. The segments are only three in number for the sake of simplicity. In FIG. 6, $S_{s1}$, $S_{s2}$ and $S_{s3}$ are segment signals which instruct the display states of segments $S_1$, $S_2$ and $S_3$ respectively. 15's are change-detectors of the display states, and they send out a signal only when the segment display states should be changed. 16's are the discriminators which tell whether the display state change is from coloration to erasure or vice versa. 17 is an adder which counts the number of segments which change the display states, and then gives the constant current source 18 the instruction telling the direction and amount of the current. 19's are analogue bilateral switches placed in series with corresponding segments, and are turned on or off in synchronization with the current source to change the display state. These switches 19 are kept off to put the display segments in the memory state.

For one thing, the color density of ECD becomes higher as the charge area density becomes larger, or to put it in another way, the same charge area density gives the same color density. For another, in a multisegment display, different combinations of segments give various display patterns with different total areas of segments. So, to change the current value in right proportion to the total segment area is essential to get the uniform color density when a fixed time duration is used to color segments. This also applies to erasing.

Another important thing in driving ECD is to minimize the power dissipation. As mentioned before, ECD has the inherent memory effect, and this effect can be utilized to minimize the power dissipation in such a manner that, in changing one display pattern to another, only segments not common to both patterns are colored or bleached, with other segments kept in the memory state.

So it is clear that changing the current value and erasing and coloring of only segments not common to both patterns are necessary to drive ECD by constant current driving with one current source and minimum power dissipation, and this is materialized in the following manner.

Changes of segment signals $S_{s1}$, $S_{s2}$ and $S_{s3}$ are detected by the change-detectors 15. Discriminators 16 tell whether those changes are from coloration to erasure or from erasure to coloration. The adder 17 counts the number of segments which change the display states. The constant current source 18 receives the signal from the adder 17 to change the current value. The direction of the current is also instructed by the 17. Bilateral switches 19 are placed in series with segments, switched on or off by the discriminators 16 in synchronization with the current source control.

Figure 7:
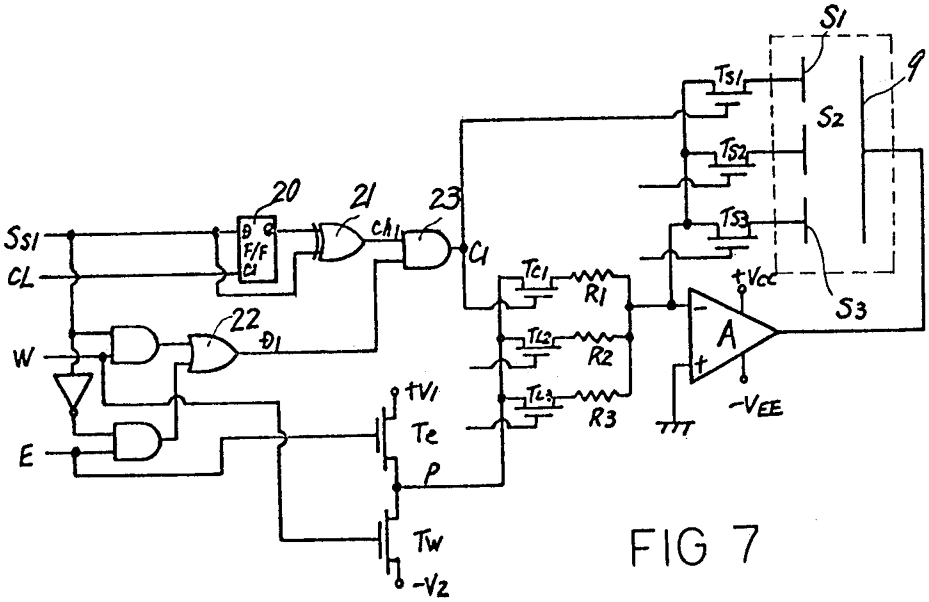
FIG. 7 is a circuit diagram of the driver circuit of the present invention.
Figure 8:
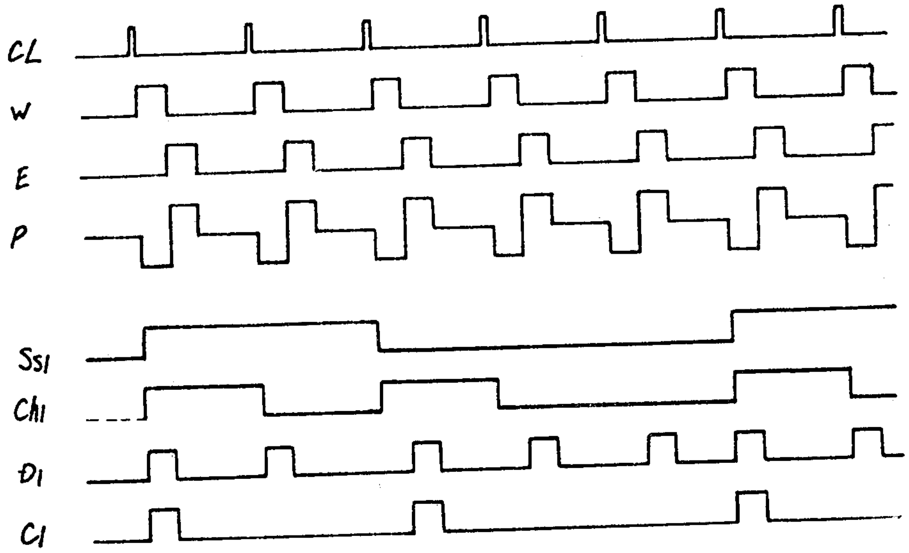
FIG. 8 is a time chart showing various signals occurring within the driver circuit of FIG. 7.

The more detailed illustration of the present invention is given in FIG. 7. FIG. 8 is the timing diagram of signals in FIG. 7. In FIG. 7, 9 is a counter electrode; $S_1$, $S_2$ and $S_3$ display segments; $T_{s1}$, $T_{s2}$ and $T_{s3}$ bilateral switches to choose proper segments for a display pattern; A a differential amplifier; $R_1$, $R_2$ and $R_3$ resistors; $T_e$ and $T_w$ bilateral switches to decide the proper polarity of the current; CL the clock pulse for the D-type flip-flop 20; W the timing signal for writing; E the timing signal for erasing; $S_{s1}$ the segment signal to instruct the display state of display segment $S_1$, and High means the segment should be colored and Low means the segment should be erased; P the voltage of the point connected to voltage sources $+V1$ and $-V2$ through the switches $T_w$ and $T_e$; and the signals CL, W, E and P are common to other segments. The display pattern changes are to happen at the rear end of CL, and the time duration between pattern changes is an integer number times the CL period.

Now the operation of the circuit in FIG. 7 will be described, taking up as an example the operation procedure only for segment $S_1$.

The segment signal change is detected by the Exclusive-OR gate 21 with its inputs $S_{s1}$ and the output Q of the D-type flip-flop 20. When $S_{s1}$ changes its state the output $C_{h1}$ of the exclusive-OR gate 21 goes high, but if its state is the same $C_{h1}$ remains low. The output of an OR gate 22 is $D_1$ which gets high with W when $S_{s1}$ is high, and with E when $S_{s1}$ is low. $C_1$ is the output of an AND gate 23 with its inputs $C_{h1}$ and $D_1$. So, suppose $S_{s1}$ goes high and remains so, only one pulse of W appears as $C_1$, whereas, when $S_{s1}$ goes low and remains so, only one pulse of E appears as $C_1$. On the other hand, P is $+V_1$ when E is high; $-V_2$ when W is high as $T_e$ and $T_w$ are controlled by E and W respectively. P is lead to resistor $R_1$ through a switch $T_{c1}$. The switches $T_{c1}$ and $T_{s1}$ are controlled by the signal $C_1$.

From the functions of circuit elements mentioned above, the operation sequence is as follows when $S_{s1}$ goes high from low. $C_1$ goes high and remains so for only one pulse duration of W, and turns on the switches $T_{s1}$ and $T_{c1}$ simultaneously. For this moment, the constant current $V_2/R_1$ flows through the resistor $R_1$, having passed through the switch $T_{s1}$ and the segment $S_1$, and the segment $S_1$ is colored as the current flows from the counter electrode 9 to the segment $S_1$.

On the other hand, when $S_{s1}$ falls low, $C_1$ goes high and remains so for only one pulse duration of E, the constant current $V_1/R_1$ flows from the resistor $R_1$ to the counter electrode 9, bleaching the segment $S_1$.

The segments $S_2$ and $S_3$ are colored or bleached in the same manner as the segment $S_1$, though circuitry about these segments is not shown in FIG. 7 for the sake of simplicity. So, when $S_{s1}$ and $S_{s2}$ go high at a time current $V_2/(1/R_1+1/R_2)$ flows from the counter electrode 9 to P, coloring the segments $S_1$ and $S_2$ as the switches $T_{s1}$ and $T_{s2}$ are switched on. At the other time when all segment signals go low, current $V_1/(1/R_1+1/R_2+1/R_3)$ flows from P to the counter electrode 9, bleaching all the three segments.

Values of the resistors $R_1$, $R_2$ and $R_3$ should be chosen in such a manner that $1/R_1:1/R_2:1/R_3=As_1:As_2:As_3$, where $As_1$, $As_2$ and $As_3$ are areas of the segments $S_1$, $S_2$ and $S_3$, respectively. With the resistors $R_1$, $R_2$ and $R_3$ chosen this way, the current value is in direct proportion to the total area of the chosen segments for coloration or erasure to result in coloring segments to the same color density. It goes without saying that all resistor values can be the same when all segment areas are the same.

Enough erasure is secured with the charge for erasing being larger than that for coloring. This can be done by the following two ways. One is to make $V_1$ larger than $V_2$ when the pulse durations of W and E are the same. The other is to make the pulse duration of E longer than that of W when $V_1$ and $V_2$ are equal.

We touch on the maximum value of the applied voltage across ECD.

In ECD employing a solid electrochromic thin film like amorphous $WO_3$, display segments have high impedence when erased; low impedence when colored. So, around the end of E, the applied voltage goes abruptly high, and this high voltage brings on harmful side reaction and resultant shorter life time. To avoid this it is necessary to set a ceiling to the negative applied voltage corresponding to erasing, namely, to shift the constant current driving to the constant voltage driving. For example, $V_{EE}$ in FIG. 7 should be set so as to have the most negative voltage swing about $-3$ V.

As mentioned up until now, the present invention provides the ECD driving method termed as a practical constant current driving with its constant current source value variable in direct proportion to the total area of the segments which should be colored or bleached when the display pattern is changed, with the power consumption minimized.

While only certain embodiments of the present invention have been discribled, it will be apparent to those skilled in the art that various changes and modifications may be made therein without departing from the spirit and scope of the invention as claimed.

What is claimed is:

1. In a circuit for an electrochromic display which includes an electrochromic material and a predetermined number of display segments, various combinations of the display segments defining different desired display patterns, the improvement comprising:

a current supply source means connected to the electrochromic display; and control means for selecting a constant value of the output current of said current supply source corresponding to the number of display segments which are to have their display states changed.

2. The driver circuit of claim 1, wherein the control means includes a current direction determining means for selectively determining the direction of the electric current derived from said current supply source means and flowing through said electrochromic display.

3. The driver circuit of claim 1, wherein said electrochromic display includes a counterelectrode;

wherein said display states include a bleached state achieved by a bleaching operation; and wherein said current supply source means further comprises means for maintaining the magnitude of the potential between said display segments and said counterelectrodes below a predetermined value during said bleaching of said display segments.

4. The driver circuit of claim 1, wherein said display states comprise a colored state and a bleached state, the latter being achieved by a bleaching operation; and wherein said current supply source means includes means for limiting current flow through said display segments prior to the end of said bleaching operation.

5. The driver circuit of claim 1, wherein the control means include a current direction determining means for selectively determining the direction of the electric current derived from said constant current source and flowing through said electrochromic display;

wherein said electrochromic display includes a counterelectrode;

wherein said display states include a bleached state achieved by a bleaching operation; and wherein said current supply source means further comprises means for maintaining the magnitude of the potential between said display segments and said counterelectrodes below a predetermined value during said bleaching of said display segments.

6. The driver circuit of claim 5, wherein said display states further comprise a colored state; and wherein said current supply source means includes means for limiting current flow through said display segments prior to the end of said bleaching operation.

7. The driver circuit of claim 1, wherein:

the control means include a current direction determining means for selectively determining the direction of the electric current derived from said constant current source and flowing through said electrochromic display;

said current directions including one corresponding to a display segment bleaching operation; and said current supply source means includes means for limiting current flow through said display segments prior to the end of a said bleaching operation.

8. The driver circuit of claim 7, wherein said electrochromic display further includes a counterelectrode; and wherein said current supply source means further comprises means for maintaining the magnitude of the potential between said display segments and said counterelectrode below a predetermined value during a said bleaching operation.

9. The driver circuit of claim 1, wherein said electrochromic display includes a counter electrode;

wherein said display states comprise a colored state and a bleached state, the latter being achieved by a bleaching operation; and wherein said current supply source means includes means for limiting current flow through said display segments prior to the end of said bleaching operation; and said current supply source means maintains the magnitude of the potential between said display segments and said counterelectrode below a predetermined value during a said bleaching operation.

10. The invention defined in claim 1, wherein said current supply source means further includes resistance means for individually controlling the level of current supplied to each of said display segments of a said electrochromic display during a said change of display state.

11. The invention defined in claim 10, wherein the control means includes a current direction determining means for selectively determining the direction of the electric current derived from said current source means and flowing through said electrochromic display.

12. The invention defined in claim 10, wherein:

the control means include a current direction determining means for selectively determining the direction of the electric current derived from said constant current source and flowing through said electrochromic display;

said current directions including one corresponding to a display segment bleaching operation; and said current supply source means includes means for limiting current flow through said display segments prior to the end of a said bleaching operation.

13. The invention defined in claim 12, wherein said electrochromic display further includes a counterelectrode; and wherein said current supply source means further comprises means for maintaining the magnitude of the potential between said display segments and said counterelectrode below a predetermined value during a said bleaching operation.

14. The invention defined in claim 10, wherein said electrochromic display includes a counterelectrode;

wherein said display states comprise a colored state and a bleached state, the latter being achieved by a bleaching operation; and wherein said current supply source means includes means for limiting current flow through said display segments prior to the end of said bleaching operation; and said current supply source means maintains the magnitude of the potential between said display segments and said counterelectrode below a predetermined value during a said bleaching operation.

* * * * *